(12) United States Patent
Clements et al.

(10) Patent No.: US 7,083,238 B2
(45) Date of Patent: Aug. 1, 2006

(54) MULTI-PIECE ALUMINUM WHEEL AND ASSOCIATED METHOD

(75) Inventors: Roger Frank Clements, Aurora, OH (US); Zara Finley Hudson, Elyria, OH (US); Matthew Charles Brest, Hudson, OH (US); Donald R. Fenrich, III, Highland Township, MI (US); Warren R. Gleason, Ypsilanti, MI (US); Dennis R. Werthman, Macomb Township, MI (US)

(73) Assignee: Alcoa, Inc., Pittsburgh, PA (US)

( * ) Notice: Subject to any disclaimer, the term of this patent is extended or adjusted under 35 U.S.C. 154(b) by 177 days.

(21) Appl. No.: 10/924,364

(22) Filed: Aug. 23, 2004

(65) Prior Publication Data

US 2006/0037685 A1   Feb. 23, 2006

(51) Int. Cl.
B60C 25/14   (2006.01)

(52) U.S. Cl. .............. 301/11.1; 152/396; 152/398; 152/405; 152/409

(58) Field of Classification Search .......... 301/9.1, 301/10.1, 11.1, 64.5, 64.303; 152/396, 397, 152/398, 402, 405, 408, 409, 410, 411, 412, 152/413
See application file for complete search history.

(56) References Cited

U.S. PATENT DOCUMENTS

| | | | |
|---|---|---|---|
| 1,224,666 A * | 5/1917 | Ragsdale | 152/409 |
| 1,710,614 A * | 4/1929 | Furrer | 152/412 |
| 2,229,724 A * | 1/1941 | Burger et al. | 152/404 |
| 2,428,551 A | 10/1947 | Burger | |
| 2,576,736 A | 11/1951 | Watkins | |
| 2,636,535 A * | 4/1953 | Gaquinto | 152/412 |
| 2,802,508 A | 8/1957 | Brink | |
| 2,893,784 A | 7/1959 | Delker | |
| 3,007,507 A * | 11/1961 | Sinclair et al. | 152/413 |
| 3,880,219 A | 4/1975 | Mitchell | |
| 3,882,919 A | 5/1975 | Sons, Jr. et al. | |
| 4,165,777 A | 8/1979 | Sano | |
| 4,327,791 A | 5/1982 | Strader | |
| 4,369,826 A | 1/1983 | Hendrickson | |
| 4,407,348 A | 10/1983 | Suckow | |
| 4,466,670 A | 8/1984 | Kaji | |
| 4,481,997 A | 11/1984 | Strader | |
| 4,823,854 A | 4/1989 | Payne et al. | |
| 4,836,261 A | 6/1989 | Weeks et al. | |
| 4,997,235 A | 3/1991 | Braungart | |

(Continued)

FOREIGN PATENT DOCUMENTS

BD   24 35 044   2/1975

(Continued)

*Primary Examiner*—Russell D. Stormer
(74) *Attorney, Agent, or Firm*—Greenberg Traurig LLP; Harry A. Hild, Jr.

(57) ABSTRACT

A multi-piece safety wheel includes a plurality of circumferentially spaced, interlocking bosses and tabs on the inner rim portion and outer rim portion. In the event of improper disassembly of the wheel with an inflated tire mounted thereon, any failure of the wheel assembly fasteners will result in the outer rim portion separating from the inner rim portion a sufficient distance to vent air pressure from within the tire, at which point the interlocking bosses and tabs resist further movement of the outer rim portion. The outer rim portion is thereby resisted from becoming a potentially dangerous projectile. A method of safely deflating the tire upon improper disassembly of the multi-piece safety wheel is also provided.

18 Claims, 5 Drawing Sheets

U.S. PATENT DOCUMENTS

| | | |
|---|---|---|
| 5,000,241 A | 3/1991 | Patecell |
| 5,018,566 A | 5/1991 | Thoni |
| 5,215,137 A | 6/1993 | Weeks et al. |
| 5,343,920 A | 9/1994 | Cady |
| 6,315,366 B1 | 11/2001 | Post et al. |

FOREIGN PATENT DOCUMENTS

| | | | |
|---|---|---|---|
| BD | DE 37 38 009 | | 5/1989 |
| CH | 348883 | | 9/1960 |
| DE | 3630226 | * | 3/1987 |
| EP | 0 284 507 | | 3/1988 |
| FR | 602621 | | 3/1926 |
| FR | 626258 | | 9/1927 |
| FR | 6210/29 | | 2/1930 |
| FR | 1141234 | | 8/1957 |
| WO | WO 82/02518 | | 8/1982 |

* cited by examiner

MULTI-PIECE ALUMINUM WHEEL AND ASSOCIATED METHOD

BACKGROUND OF THE INVENTION

1. Field of the Invention

The present invention relates to a safety wheel assembly. More specifically, the invention provides a safety wheel assembly structured to permit venting of air pressure within the tire if the wheel is improperly disassembled while an inflated tire is mounted on the wheel. The invention further provides a method of venting air pressure within the tire upon improper disassembly of the wheel.

2. Description of the Related Art

Multi-piece wheels having a rim with an inner bead retaining flange and a detachable outer bead retaining flange are commonly used to facilitate mounting tubeless tires on the wheel. Such wheels are particularly useful for mounting run flat inserts within tubeless tires. The tire and any desired run flat insert may be mounted on the rim with the outer retaining flange removed. The outer retaining flange may then be installed, and the tire inflated to the appropriate pressure.

The rim components of a two-piece wheel are typically secured together using a plurality of circumferentially spaced bolts, and are also secured to a vehicle using a plurality of circumferentially spaced threaded rods passing through a disc portion of the rim, and having lug nuts secured thereto. On occasion, an individual wishing to remove the wheel from a vehicle will begin removing the bolts holding the rim and outer retaining flange together instead of removing the lug nuts. When most of the bolts are removed, there is a danger that the few remaining bolts will fail, so that the air pressure within the tire propels the outer retaining flange towards the individual disassembling the wheel with significant velocity, resulting in a risk of injury or possibly even death to the individual.

Numerous patents propose solutions to this problem. For example, U.S. Pat. No. 2,428,551, issued to F. W. Burger on Oct. 7, 1947, discloses a safety wheel. The wheel includes a rim upon which the tire is mounted, and a bead locking ring fitting around the outer edge of the rim for securing the outer edge of the tire onto the rim. The bead locking ring is slidably mounted on the rim so that, when the tire is inflated, it will push the bead locking ring outward, resisting access to the bolts securing the bead locking ring to the rim. It is necessary to deflate the tire to slide the bead locking ring inward to gain access to these bolts. Such a wheel would not work with a run flat insert, because a run flat insert must securely hold both beads of the tire between itself and the opposing bead retaining flanges of the wheel. A run flat insert would therefore resist movement of the bead locking ring.

Several patents disclose wheel assemblies intended to vent air pressure from the tire if improper disassembly of the wheel is attempted. For example, U.S. Pat. No. 4,481,997, issued to D. S. Strader on Nov. 13, 1984, discloses a tire and rim combination with a safety insert. The rim includes an inner rim segment having an inner bead retaining flange, and defining a plurality of air bleed channels about 45 degrees apart. The wheel mounting disc is integral with the inner rim segment. An outer rim segment including an outer bead retaining flange is bolted to the inner rim segment, with a resilient O-ring seal therebetween. If disassembly of the wheel is attempted while the tire is inflated, compressive force on the sealing O-ring is removed, thereby permitting air to vent from the tire through the air bleed channels. This patent also discloses a run flat safety insert having an inner band extending around the rim base, and having projecting outboard and inboard edges for engaging the beads of the tire, clamping the beads against the bead retaining flanges. A plurality of axially extending ribs project radially inwardly from the bands, engaging the inner rim. An outer ledge is mounted coaxially with the inner band by a circumferential array of support struts. The outer ledge defines a recess around its circumference. A container of non-water base liquid lubricant is mounted within this recess. In the event of a ruptured tire, this container will engage the inner surface of the tire. The outer surface of the outer ledge is roughened with microscopic pockets for retaining lubricant.

U.S. Pat. No. 4,823,854, issued to R. E. Payne et al. on Apr. 25, 1989, discloses a safety insert for a safety tire. The tire includes an inner rim and an outer rim that are bolted together around their circumference, with a resilient O-ring seal therebetween. Air bleed passages are defined between the inner rim and outer rim segment so that, if the bolts holding the inner rim and outer rim segments are removed while a tire is inflated, air will be permitted to bleed out of the tire through the air bleed passages before all of the bolts are removed. The run flat insert includes a sheet metal base defining a pair of outer edges depending inward towards the rim, and an elastomeric trim around its outer surface. If the tire is deflated, pressure on the tread will push the outer edges outward, thereby securing the deflated tire between the outer edges of the run flat insert and the rim.

U.S. Pat. No. 4,836,261, issued to J. B. Weeks et al. on Jun. 6, 1989, discloses take-apart wheel assembly for use with a tubeless tire. The assembly includes an inner rim, an outer rim, and a disc. The disc and inner rim are welded together, and the outer rim is bolted to the disc. The disc defines a plurality of air bleed passages around its circumference. If an individual improperly begins removing the nuts holding the outer rim to the disc while a tire is inflated, the seal between the inner rim, outer rim, and disc will be broken, so that air will bleed out through the air passages before all of the nuts are removed. The same wheel construction is disclosed in corresponding European Patent Application No. 0 284 507 A2, published on Sep. 28, 1988. U.S. Pat. No. 5,215,137, issued to J. B. Weeks et al. on Jun. 1, 1993, discloses a safety tire and take-apart wheel assembly. The assembly includes an inner rim and an outer rim to which a disc is welded. The inner rim and outer rim are bolted together with an O-ring therebetween for providing an air seal. If bolts are removed from the wheel assembly while the tire is inflated, the outer rim will flex outward to break the air seal and allow the tire to deflate before all of the bolts are removed or fail. The length of the bolts is sufficient so that the inner and outer rims are separated sufficiently for air venting to occur before the nuts are completely removed from the bolts. A run flat safety insert is carried by the wheel assembly inside the tire. The air inflation opening is located in the outer rim portion, thereby providing greater room for the wheel brake system. The valve mounting struction includes a connector sleeve having insufficient size for passage of an inflation valve customarily provided on an inner tube, thereby resisting use of an inner tube within the tire. If an inner tube were used within the tire, the safety venting feature would prevent air from exiting the tire if the wheel were disassembled while the tire was inflated.

U.S. Pat. No. 5,215,137, issued to J. B. Weeks et al. on Jun. 1, 1993, discloses a safety tire and take-apart wheel assembly. The assembly includes an inner rim and an outer rim to which a disc is welded. The inner rim and outer rim are bolted together with an O-ring therebetween for providing an air seal. If bolts are removed from the wheel assembly while the tire is inflated, the outer rim will flex outward to break the air seal and allow the tire to deflate before all of the bolts are removed or fail. The length of the bolts is sufficient so that the inner and outer rims are separated sufficiently for air venting to occur before the nuts are completely removed from the bolts. A run flat safety insert is carried by the wheel assembly inside the tire. The air inflation opening is located in the outer rim portion, thereby providing greater room for the wheel brake system. The valve mounting structure includes a connector sleeve having insufficient size for passage of an inflation valve customarily provided on an inner tube, thereby resisting use of an inner tube within the tire. If an inner tube were used within the tire, the safety venting feature would prevent air from exiting the tire if the wheel were disassembled while the tire was inflated.

U.S. Pat. No. 6,315,366, issued to C. C. Post et al. on Nov. 13, 2001, discloses a safety wheel assembly having an inner rim, an outer rim, and a disc within the outer rim. The disc is joined to the inner rim by a single weld passing around the circumference of the disc. A series of bolts joins the outer rim to the disc. The removable outer rim facilitates installation of a tire and/or run flat insert onto the rim. An elastomeric seal is located between the inner rim, outer rim, and disc. In the event that the bolts holding the outer rim to the disc are loosened, the airtight seal formed the elastomeric seal will be broken, permitting air to exit the tire past the elastomeric seal prior to the complete removal of the nuts from the bolts.

In the experience of the present inventors, wheel designs such as those described above may fail to vent air pressure from the tire if the tire is improperly disassembled, creating a risk of injury when the last few remaining bolts holding the wheel together fail. The wheel assembly bolts will typically be installed and removed in a star pattern, so there will rarely be one side of the outer retaining flange that is completely unsupported, with no resistance to deforming and permitting air to bleed out.

U.S. Pat. No. 5,343,920, issued to J. M. Cady on Sep. 6, 1994, discloses a wheel assembly with flange securing and pressure relieving means. The assembly includes a rim and an outer flange bolted to the rim. An air passage extends from the interior of the tire to the opening through which the nut securing the outer flange to the rim passes. An O-ring is located between the nut and the inner flange, thereby providing an airtight seal over the air passage. Upon loosening of the nut, the airtight seal is broken, and air is permitted to vent from the tire.

One-piece wheels are sometimes used to avoid the disadvantages of a two-piece wheel. However, such wheels are difficult and expensive to manufacture, and may, for example, require as much as 1,200 pounds of aluminum to make a wheel weighing about 100 pounds.

Aluminum is a preferred material for manufacturing a wheel due to its combination of strength and light weight. Presently available steel wheels may weigh as much as 240 pounds, and require two individuals to remove from a vehicle. Additionally, if these wheels are used on an amphibious vehicle, the affect on buoyancy will be negative.

Several other patents disclose various wheel designs. For example, U.S. Pat. No. 512,619, discloses a take-apart wheel assembly, having no means for venting air pressure if the wheel is disassembled while the tire is inflated.

U.S. Pat. No. 2,576,736, issued to C. L. Watkins on Nov. 27, 1951, describes a wheel rim having a removable retaining band. No means for venting air pressure within the tire if the retaining band is removed while the tire is inflated are disclosed.

U.S. Pat. No. 2,802,508, issued to W. S. Brink on Aug. 13, 1957, discloses a truck rim design. The rim is intended for use with truck tires operated at lower than usual inflation pressure during movement through mud, sand, snow, and soft soil. This patent does not disclose a means of venting air from a tire if the wheel is disassembled while the tire is inflated.

U.S. Pat. No. 2,893,784, issued to T. C. Delker on Jul. 7, 1959, discloses a co-rotating dual wheel construction. Although the wheels have a two-piece rim design, there is no disclosure of any feature that would permit air within the tires to ventilate if the wheel was disassembled with the tire inflated.

U.S. Pat. No. 3,880,219, issued to W. E. Mitchell on Apr. 29, 1975, discloses a vehicle wheel. The wheel includes a flat base mounting for a tire, so that the tire beads cannot escape from the rim as they could in the case of a well base rim if the tire becomes deflated. The wheel is made from an inner rim, an outer rim, and a disc. A rubber O-ring fits between the inner rim and the outer rim to prevent leakage of air therethrough. This patent does not disclose any means of venting air from the tire if the wheel is disassembled with the tire inflated.

U.S. Pat. No. 3,882,919, issued to C. C. Sons, Jr., et al. on May 13, 1975, discloses a safety rim. The rim includes a base having an inner flange supported against a rim base lip, and an outer flange supported against the lip of a bead seat band. The outer flange and bead seat band are secured to the base by a lock ring, which is retained in position by locks threadedly secured to the base. Air passageways are provided for venting air from the tire if inflation of the tire is attempted when the lock ring and blocks are properly installed.

U.S. Pat. No. 4,165,177, issued to S. Sano on Aug. 28, 1979, discloses a device for joining surfaces of a split rim and a wheel. No safety venting device is disclosed.

U.S. Pat. No. 4,327,791, issued to D. S. Strader on May 4, 1982, discloses a safety tire and wheel assembly. The wheel includes a disc welted around its circumference to an inner rim segment. An outer rim segment is removably mounted to the inner rim segment by a plurality of nuts secured to threaded studs welded to the disc. The run flat insert includes a base having an eye-shaped cross section. A band surrounds the base with U-shaped bearing elements between the band and the base. The band is thereby permitted to slide with respect to the base.

U.S. Pat. No. 4,369,826, issued to V. P. Hendrickson on Jan. 25, 1983, discloses a multi-piece wheel structure. The wheel structure includes a rim having an inner bead retaining flange, and an outer bead retaining flange held in place by a locking ring. An air sealing ring is disposed within a channel in communication with the inflation valve, inside the locking ring. If the locking ring is not properly installed, the air sealing ring will be biased into the usual location of the locking ring, thereby resisting inflation of the tire by permitting air to pass through this channel, back outside the tire. This patent was based on International Application No. PCT/US81/00091 (Publication No. WO 82/02518), published Aug. 5, 1982.

U.S. Pat. No. 4,466,670, issued to Y. Kaji on Aug. 21, 1984, discloses a three-piece wheel for vehicle tires. No method of venting the air from the tire if the wheel is partially disassembled while the tire is inflated is disclosed.

U.S. Pat. No. 4,997,235, issued to M. Braungart on Mar. 5, 1991, discloses a two-piece wheel rim having increased disc area in proportion to the overall diameter of the rim for the purpose of providing a more light-weight apparatus.

U.S. Pat. No. 5,000,241, issue to T. C. Patecell on Mar. 19, 1991, discloses a unitary bead lock and run flat roller support ring for pneumatic tires on two-part wheels. The support ring includes a central portion and a pair of outwardly extended flanges for engaging the beads of the tire. The run flat assemblage surrounds the center portion of the ring.

U.S. Pat. No. 5,018,566, issued to L. Thoni on May 28, 1991, discloses a multi-part bolted steel rim. No means for venting the air in the event that the rim is disassembled while the tire is inflated is disclosed.

German Patent Application No. 37 38 009 A1, published on May 24, 1989, discloses a wheel having an inner rim within an outer rim bolted thereto, and a seal therebetween.

U.K. Patent No. 325,700, issued to W. Marx on Feb. 27, 1980, discloses a take-apart rim for the wheels of vehicles. No means of venting air pressure within a tire if the wheel is disassembled with the tire inflated is disclosed.

Various take-apart wheel assemblies are disclosed in Swiss Patent No 348,883, issued Oct. 31, 1960; German Patent Application No. 41 41 868 A1, published Jan. 14, 1993; German Patent Application No. 24 35 044, published on Feb. 20, 1975; French Patent No. 602,621, published Mar. 23, 1926; French Patent No. 626,258, published in Sep. of 1927; and French Patent No. 1,141,234, published Aug. 28, 157.

Accordingly, there is a need for a multi-piece wheel having less weight than existing wheels. There is a further need for a multi-piece wheel capable of receiving a run flat insert while also providing a reliable and safe means of venting air should the inflated tire/wheel assembly be improperly disassembled.

SUMMARY OF THE INVENTION

The present invention provides a lightweight safety wheel assembly that is capable of receiving a run flat insert thereon, and that provides for safe venting of air pressure if the wheel is improperly disassembled with an inflated tire installed thereon. The present invention further provides a method of safely venting air from a tire in the event of improper disassembly of a multi-piece safety wheel upon which the tire is mounted.

As used herein, improper disassembly of the tire/wheel and contents therein refers to attempting to disassemble the wheel while a pneumatic tire mounted upon the wheel is inflated, thereby creating a risk of a portion of the tire, wheel, and/or contents therein becoming a projectile, as well as disassembling the tire/wheel and contents therein under other circumstances providing an undesirable safety risk.

The safety wheel assembly includes an inner rim portion having an inner bead retaining flange and a removable outer rim portion. The inner rim portion defines a central opening and a means for mounting the assembly to a vehicle, which in one preferred embodiment include a plurality of circumferentially spaced apertures. The disc portion further includes a means for securing the wheel to the outer rim portion, for example, a plurality of circumferentially spaced holes for receiving bolts or other fasteners therethrough. A plurality of safety bosses extend radially outward from the disc portion, being circumferentially spaced around the disc portion. The disc portion may also include an aperture for an inflation valve, located adjacent to a corresponding hole defined within the outer rim portion.

The outer rim portion includes a flange for securing the bead of a tire upon the inner rim portion. The outer rim portion further includes a plurality of radially inwardly extending safety tabs dimensioned and configured to fit inside of the safety bosses of the inner rim portion, with a small gap therebetween. The outer rim portion includes means for being secured to the inner rim portion, for example, a plurality of circumferentially spaced holes corresponding to the circumferentially spaced holes of the inner rim portion, for receiving bolts or other fasteners therethrough. The outer rim portion may also define a valve opening corresponding to the valve opening defined within the disc portion of the inner rim portion.

In use, a valve or other inflation control device may be secured to the valve opening in the inner rim portion, terminating just inside of the disc portion. A tire, and if desired, a run flat insert and/or other hardware, will be mounted on the inner rim portion. A sealing device such as an O-ring will be placed between the inner and outer rim portions. The outer rim portion will be appropriately positioned, and then the outer rim portion will be secured to the inner rim portion. The beads of the tire will thereby be retained between the inner and outer bead retaining flanges of the wheel. Once the outer rim portion is securely fastened to the inner rim portion, the tire may be inflated.

If improper disassembly of the wheel is attempted while the tire is inflated, the remaining assembly fasteners may fail after most of them have been removed. At this point, or alternatively, when all of the assembly fasteners have been removed, air pressure within the tire will cause the outer rim portion to move outward from the inner rim portion, thereby permitting the air to vent from the tire. The outer rim portion will move only a short distance before the outer safety tabs engage the inner safety bosses, thereby resisting further outward movement of the outer rim portion, and mitigating the risk of the outer rim portion becoming a potentially dangerous projectile.

A wheel assembly of the present invention may advantageously be made from high strength to weight ration materials such as aluminum alloys, providing sufficient strength while also providing lighter weight than traditional steel wheels.

A wheel of the present invention may advantageously be used with any vehicle such as an automobile, truck, military vehicle, aircraft, and/or amphibious vehicle, employing a multi-piece safety wheel assembly, which is particularly advantageous for, but not limited to, the use of tires having run flat inserts.

Accordingly, it is an object of the present invention to provide a safety wheel assembly having lighter weight than presently available wheels for equivalent vehicles.

It is another object of the invention to provide a safety wheel assembly having a means for resisting the outer rim portion from becoming a projectile if the tire/wheel assembly is improperly disassembled while the tire is inflated.

It is a further object of the invention to provide a safety wheel assembly structured to receive a run flat insert within the tire.

It is another object of the invention to provide a safety wheel assembly that is simpler and less costly to manufacture than presently available wheels.

It is a further object of the invention to provide a safety wheel assembly having a means for visually distinguishing the fasteners holding the components together from the fasteners (for example, lug nuts) holding the tire/wheel assembly onto a vehicle.

It is a further object of the invention to provide a method of safely venting air from a tire upon improper disassembly of the inflated tire/wheel assembly.

These and other objects of the invention will become more apparent through the following description and drawings.

BRIEF DESCRIPTION OF THE DRAWINGS

Like reference characters denote like elements throughout the drawing.

DETAILED DESCRIPTION OF THE PREFERRED EMBODIMENTS

The present invention provides a multi-piece safety wheel that, in the event of improper disassembly while an inflated tire is mounted thereon, and upon the failure of the remaining assembly fasteners and/or removal of all of the wheel assembly fasteners, will permit the outer rim portion to move outward a sufficient distance to vent air from the tire while resisting further outward movement of the outer rim portion.

Figure 1:
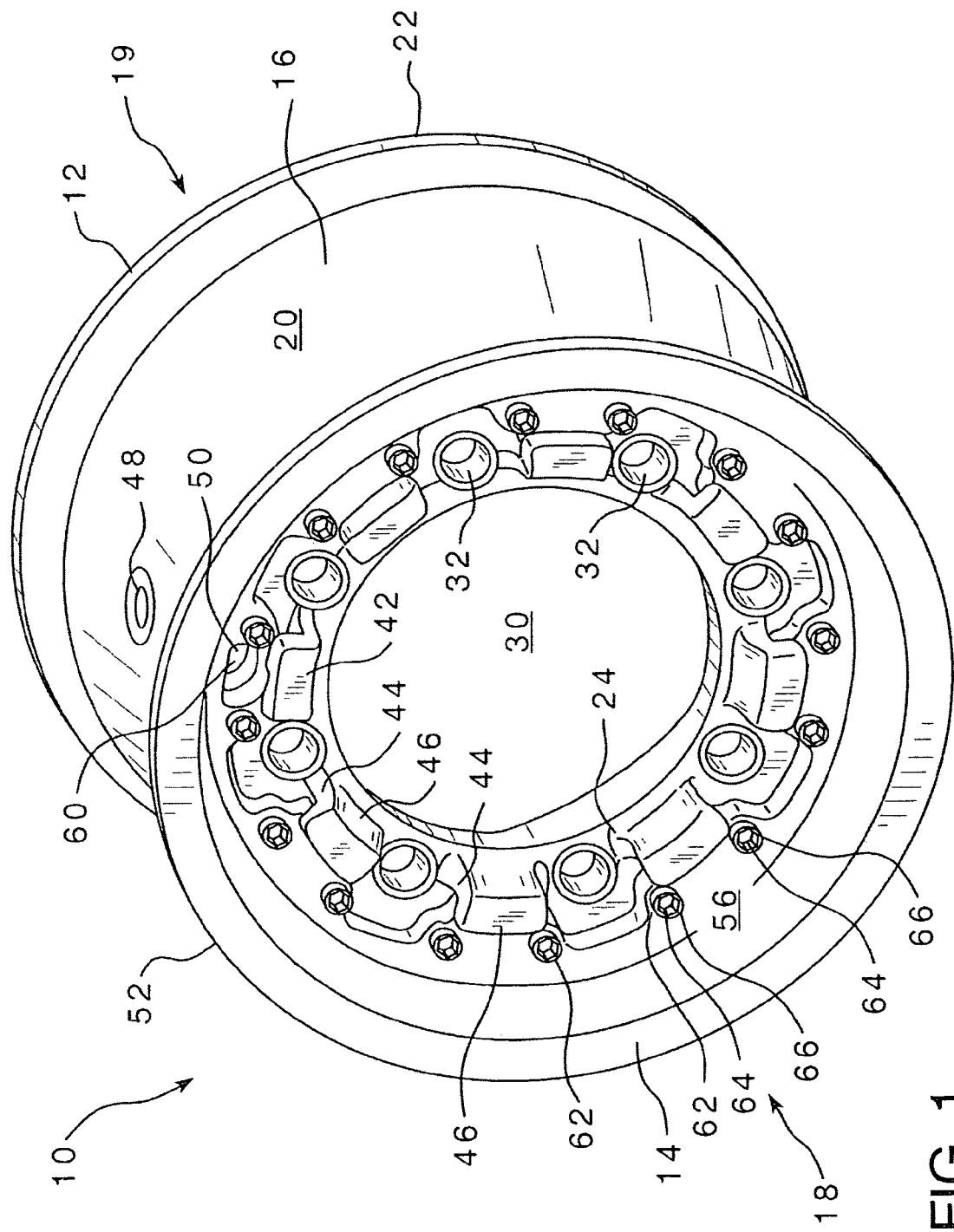
FIG. 1 is an isometric front view of a wheel according to the present invention.
Figure 2:
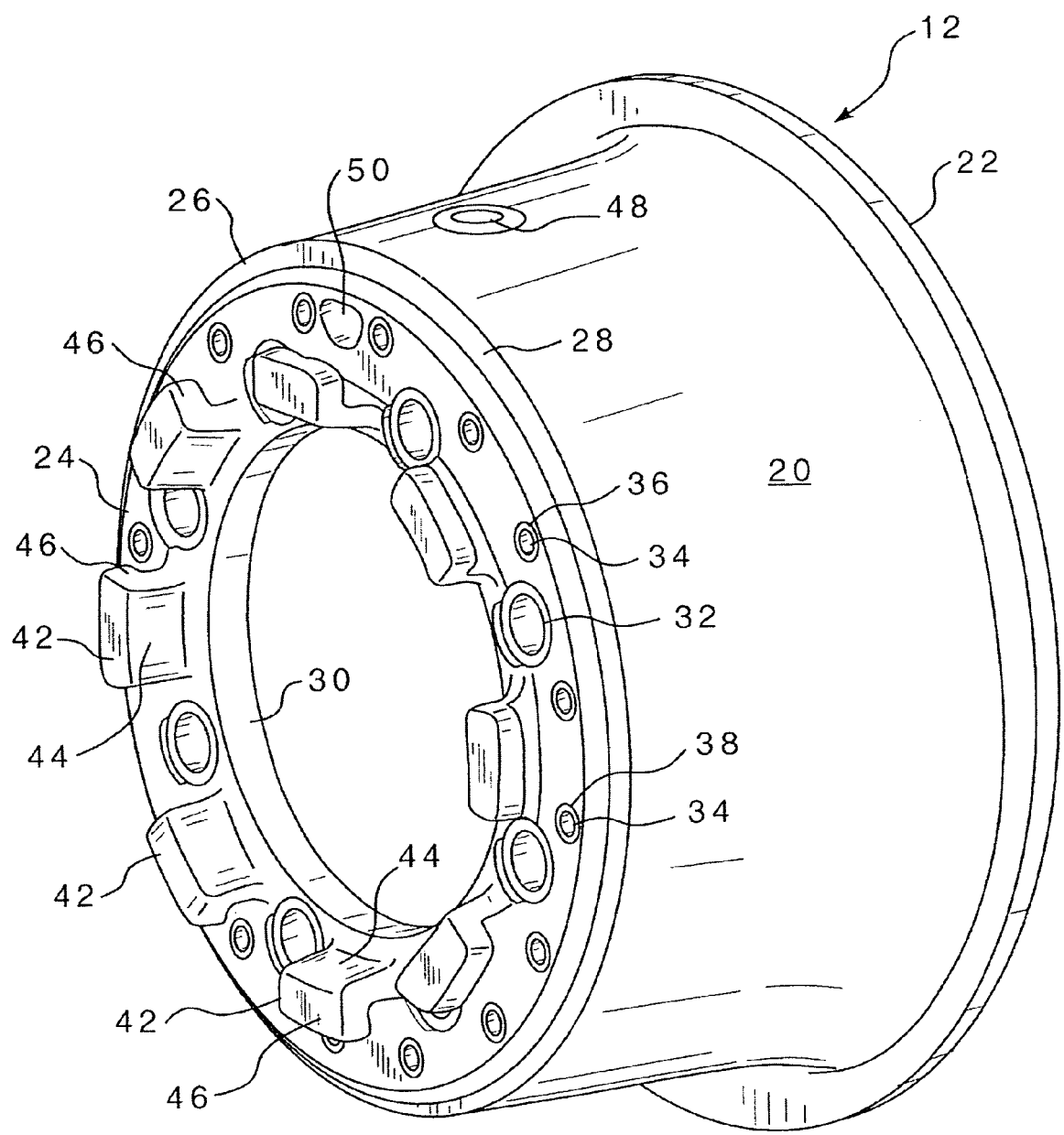
FIG. 2 is an isometric side view of an inner rim portion for a wheel according to the present invention.
Figure 3:
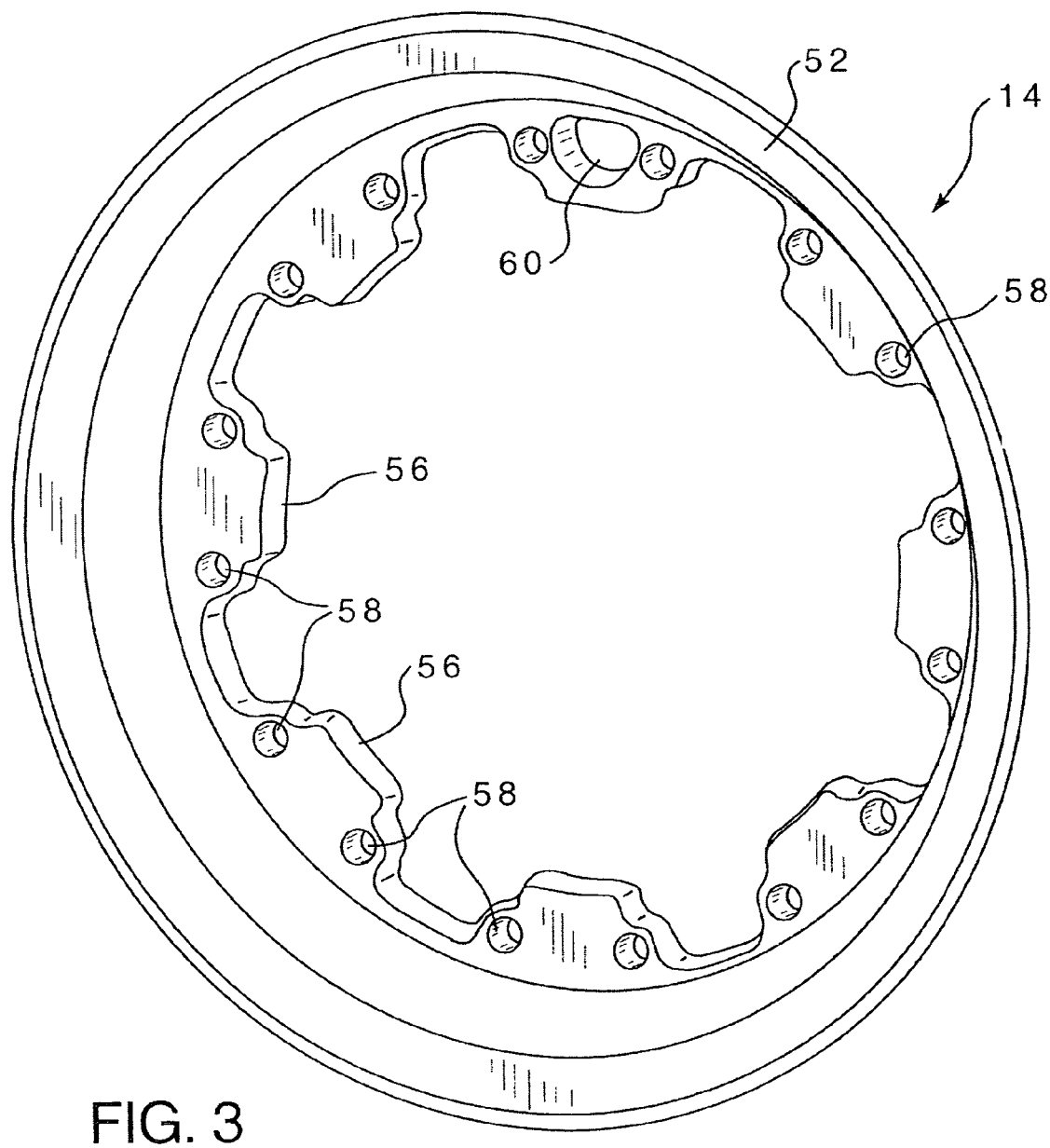
FIG. 3 is an isometric front view of an outer rim portion for a wheel according to the present invention.
Figure 4:
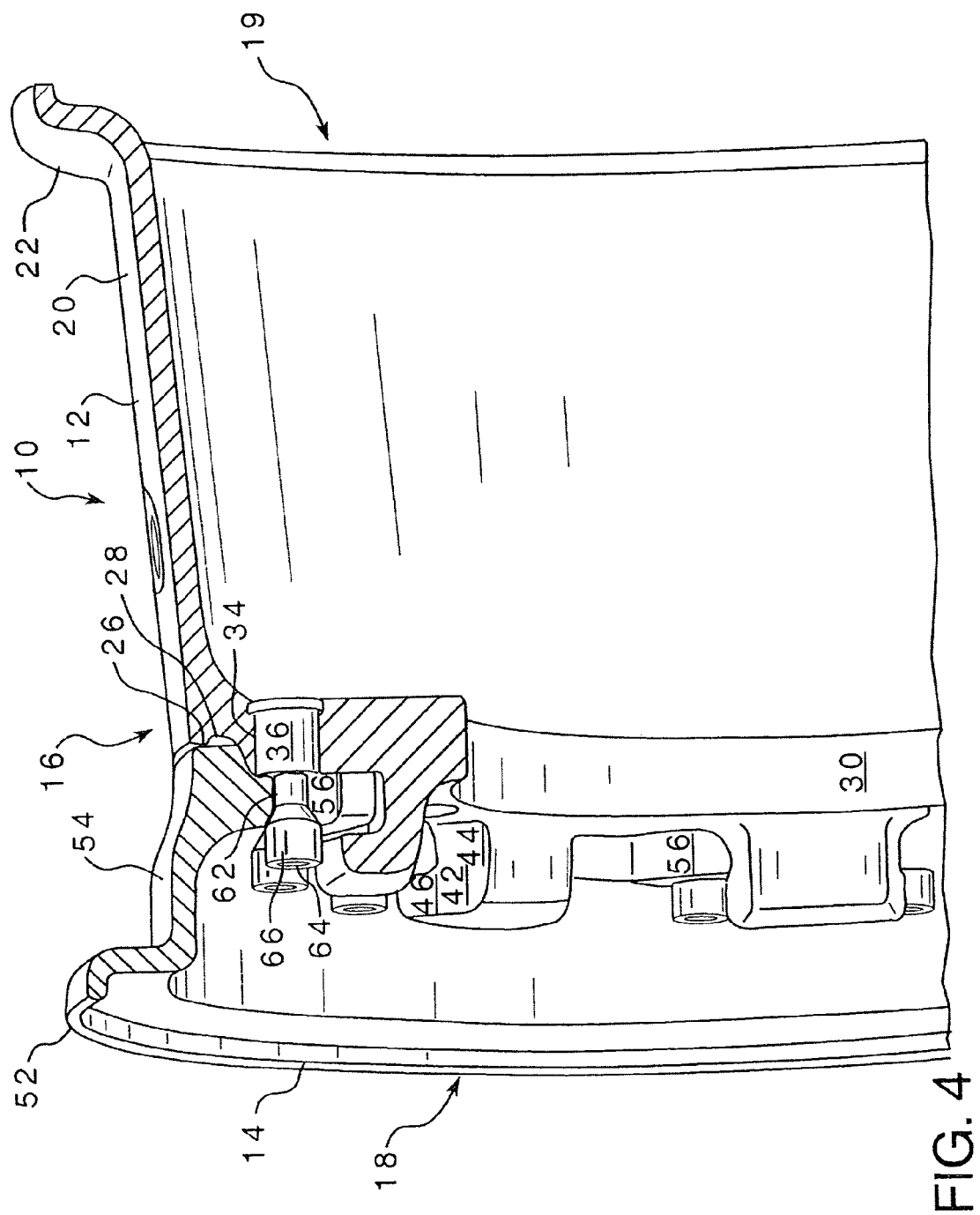
FIG. 4 is a cross-sectional edge view of a wheel according to the present invention.
Figure 5:
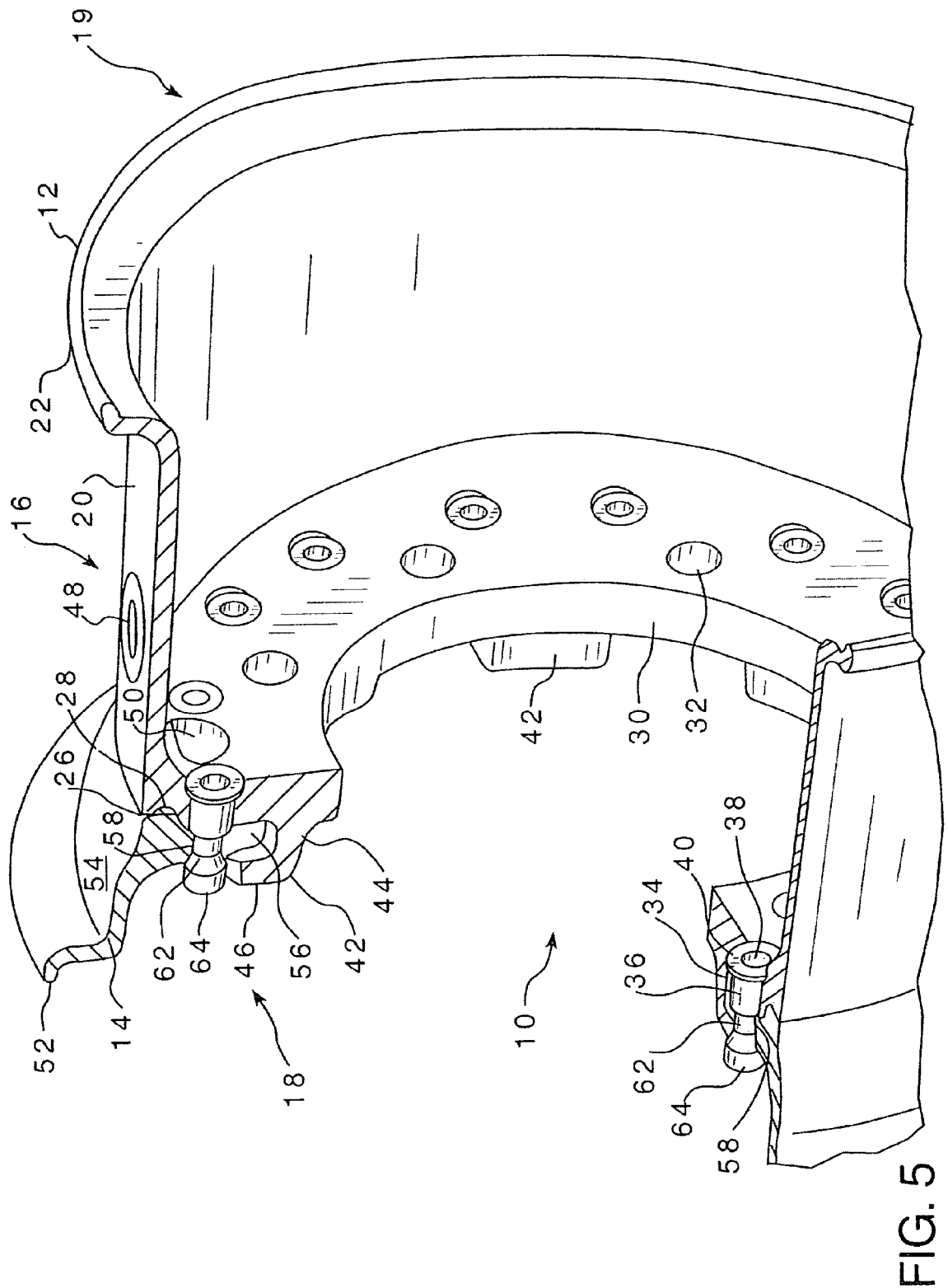
FIG. 5 is an isometric cross-sectional edge and rear view of a wheel according to the present invention.

Referring to FIGS. 1 and 4–5, the wheel 10 includes an inner rim portion 12 and outer rim portion 14. The wheel 10 defines a well 16 for securing a tire thereon, an outer face 18, and an inner face 19.

The inner rim portion 12 is best illustrated in FIGS. 1–2 and 4–5. The inner rim portion 12 defines an inner well surface 20 having an inner bead retaining flange 22 extending away from the wheel's central axis along the inner edge of the inner well surface 20, and a disc portion 24 extending towards the wheel's central axis along the outside edge of the inner well surface 20. The disc portion 24 includes a recessed outer edge 26 defining a circumferential channel 28 thereon for receiving an elastomeric O-ring. The disc portion 24 further defines a central mounting opening 30 and a plurality of circumferentially spaced mounting holes 32 for receiving the threaded rods upon which the lug nuts will be secured. A typical number of mounting holes 32 will be eight or ten. A plurality of wheel assembly holes are also defined within the disc portion 24, with the wheel assembly holes 34 being circumferentially spaced around the disc portion 24. The illustrated example of the wheel 10 includes sixteen wheel assembly holes 34, but a different number may be used. In general, it is preferred that the wheel assembly holes 34 are differentiated from the mounting holes 32 to provide visual distinction between these features, which can be accomplished by a difference in the number and/or diameter of the holes 32 and holes 34. The wheel assembly holes 34 are configured with their larger diameter portion corresponding to the inner face 19. The wheel assembly holes 34 are structured to receive a sleeve 36 having a threaded bore 38 structured to receive a bolt, and an outwardly extending flange 40 corresponding to the counterbore portion of the wheel assembly hole 34. A plurality of circumferentially spaced safety bosses 42 extend outward from the disc portion 24. A preferred embodiment of the safety bosses 42 includes a base portion 44 extending substantially parallel to the wheel's rotational axis, and the flange portion 46 extending radially outward from the wheel's rotational axis. In some preferred embodiments, the safety bosses 42 and mounting holes 32 may alternate with each other, so that an embodiment with eight or ten mounting holes 32 will also have eight or ten safety bosses 42. The inner well surface 20 and disc portion 24 each define an aperture 48, 50, respectively, for receiving a tire inflation device. Some preferred embodiments may use an elbow valve, which is well-known in the art of wheels, and therefore not shown.

The outer rim portion 14 is best shown in FIGS. 1 and 3–5. The outer rim portion 14 defines an outer bead retaining flange 52 and an outer well surface 54. The outer rim portion 14 also defines a plurality of circumferentially spaced safety tabs 56 extending towards the wheel's rotational axis. Each of the safety tabs 56 corresponds to a safety boss 42, and is structured to fit underneath the flange portion 46 of the safety boss 42, with a small space therebetween. In some preferred embodiments, the space between the flange portion 46 of the safety boss 42 and the safety tab 56 is about ⅛ inch. The outer rim portion 14 further defines a plurality of assembly holes 58 corresponding to the wheel assembly holes 34 in the inner rim portion. In one preferred embodiment, the assembly holes 58 are defined within the safety tabs 56. Each safety tab 56 may in some embodiments define multiple assembly holes 58. The outer rim portion 14 also defines one or more openings 60 structured to receive an inflation device, and corresponding to the opening 50 for the inflation device, which in the illustrated embodiment is defined within one of the safety tabs 56.

The outer rim portion 14 is secured to the inner rim 12 by a plurality of assembly fasteners 62, which in the illustrated embodiment are bolts passing through the assembly holes 58 to engage the threaded bore 38 of the sleeve 36. The assembly fasteners 62 are preferably visually distinguishable from the wheel mounting fasteners, which will commonly be lug nuts (not shown and well-known in the art), used to secure the wheel to a vehicle by having a different fastener head portion. For example, some embodiments of the assembly fasteners 62 may define a hexagonal hole 64 within their head portion 66 for engaging a tool. This visual difference between the assembly fasteners 62 and the wheel mounting fasteners, combined with the requirement to use a different tool to remove each, minimizes the likelihood that an individual intending to remove the wheel 10 from a vehicle will unintentionally disassemble the wheel 10 while the wheel 10 has an inflated tire thereon.

The inner rim portion 12 and outer rim portion 14 are preferably made from a lightweight forgeable metal. Preferred metals include 6xxx Series aluminum alloys, for example, 6061 aluminum alloy. Such alloys are advantageous because they may be given a T6 temper (full heat treatment), thereby relieving any stresses caused within the material by working the material. Aluminum alloys in the 5xxx Series, for example, 5454, may also be used, and such alloys will typically have an H or W (work hardened) temper. Other forgeable metals or metal alloys, such as 7xxx aluminum alloys, 2xxx aluminum alloys, magnesium, or titanium, may also be used to make the inner rim portion 12 and outer rim portion 14. If desired, different materials may be used for the outer rim portion and inner rim portion.

To assemble the wheel 10, a valve or other inflation device will be installed through the openings 48, and through the inner openings 58, but cannot pass through the outer openings 60 to allow for disassembly. A run flat insert, typically in the form of an elastomeric ring, may be inserted into a tire. Both the tire and run flat insert will be placed over the inner well surface 20 of the inner rim portion 12. A sealing device such as an elastomeric O-ring will be installed in the groove 28, as is well-known in the art of wheels and therefore not shown. The outer rim portion 14 will then be placed over the disc portion 24 of the inner rim portion 12, and then rotated slightly to align the assembly holes 34,58 and to position the safety tabs 56 under the safety bosses 42. The fasteners 62 will be secured to the sleeves 36, thereby securing the inner rim portion 12 and outer rim portion 14 together. The tire may then be inflated and the wheel may be mounted on a vehicle in the conventional manner.

In the event of improper disassembly of the wheel while an inflated tire is installed thereon, upon the failure of the remaining fasteners 62 or upon the removal of the fasteners 62, air pressure within the tire will push the outer rim portion 14 outward, thereby breaking the air seal between the inner rim portion 12 and outer rim portion 14 and permitting air to rapidly vent from the tire. Further outward movement of the outer rim portion 14 is resisted by the interaction of the safety bosses 42 and safety tabs 56, thereby resisting any tendency of the outer rim portion 14 to become a potentially dangerous projectile.

The present invention therefore provides a multi piece safety wheel having a reliable means for resisting any tendency of the outer rim portion 14 from becoming a dangerous projectile in the event of improper disassembly of the wheel with an inflated tire mounted thereon. The invention further provides a multi-piece safety wheel having visually distinguishable fasteners for holding the inner rim portion 12 and outer rim portion 14 together, possibly requiring a different tool than the fasteners used to secure the wheel 10 to a vehicle. The invention further provides a wheel that is lightweight, and may therefore be made larger without being made heavier than many presently available alternatives, thereby permitting servicing of the wheel by a single individual instead of two individuals, increasing the payload to which the vehicle is attached, and increasing the buoyancy of the vehicle to which the wheel is attached if the wheel is used with an amphibious vehicle.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A wheel, comprising:
   an inner rim portion having an inner bead retaining flange and a disk portion having a plurality of circumferentially spaced safety bosses extending radially outward therefrom; and
   an outer rim portion structured for securing to the inner rim portion, the outer rim portion having a plurality of circumferentially spaced safety tabs extending radially inward therefrom, each safety tab being structured to engage one of the safety bosses; whereby disassembly of the wheel with an inflated tire mounted thereon will cause the outer rim portion to move outward with respect to the inner rim portion a sufficient distance to vent air from the tire, with the engagement of the inner and outer safety bosses and safety tabs resisting additional outward movement of the outer rim portion.

2. The wheel according to claim 1, wherein:
   the safety bosses include a base portion-extending outward substantially parallel to an axis of rotation of the wheel, and a flange portion extending radially outward from the axis of rotation of the wheel; and
   the safety tabs extend radially inward from the outer rim portion towards the wheel's axis of rotation.

3. The wheel according to claim 1, wherein the safety tabs and safety bosses are separated by a distance of about one eighth of an inch.

4. The wheel according to claim 1:
   further comprising a plurality of circumferentially spaced mounting holes structured to receive fasteners for mounting the wheel on a vehicle; and
   wherein the inner lugs and mounting holes alternate with each other.

5. The wheel according to claim 1, wherein the outer rim portion is secured to the inner rim portion by a plurality of wheel assembly fasteners.

6. The wheel according to claim 5, wherein the number of wheel assembly bolts is about 16.

7. The wheel according to claim 5, wherein each safety tab defines at least one wheel assembly hole therein for receiving the wheel assembly fasteners.

8. The wheel according to claim 5, wherein the disk defines a plurality of circumferentially spaced mounting holes structured to receive fasteners for mounting the wheel on a vehicle.

9. The wheel according to claim 8, wherein the wheel assembly fasteners are visually distinguishable from the fasteners used to mount the tire/wheel assembly to the vehicle.

10. The wheel according to claim 9, wherein the wheel assembly fasteners are a different diameter than the fasteners used to mount the tire/wheel assembly to the vehicle.

11. The wheel according to claim 9, wherein the mounting holes are different in number from the wheel assembly holes.

12. The wheel according to claim 11, wherein a plurality of wheel assembly fasteners correspond to each mounting hole.

13. The wheel according to claim 9, wherein the wheel assembly fasteners are structured to be secured and unsecured by a tool that is different from a tool used to secure and unsecure the fasteners used to mount the tire/wheel assembly to the vehicle.

14. The wheel according to claim 1, wherein the wheel is made from at least one material selected from the group consisting of 2xxx series aluminum alloys, 5xxx series aluminum alloys, 6xxx series aluminum alloys, 7xxx series aluminum alloys, magnesium, and titanium.

15. A method of resisting undesired movement of an outer rim portion from an inner rim portion of a wheel when the wheel is disassembled while an inflated tire is mounted thereon, the method comprising:
   providing an inner rim portion having an inner bead retaining flange and a disk portion having a plurality of circumferentially spaced safety bosses extending radially outward therefrom;
   providing an outer rim portion structured for securing to the inner rim portion, the outer rim portion having a plurality of circumferentially spaced safety tabs extending radially inward therefrom, each safety tab being structured to engage one of the safety bosses; and
   upon disassembly of the wheel while an inflated tire is installed on the wheel, permitting the outer rim portion to separate from the inner rim portion a sufficient distance to vent air from the tire, and resisting farther travel of the outer rim portion through the interaction of the safety bosses and safety tabs.

16. The method according to claim 15, wherein the outer rim portion is permitted to travel a distance of about one eighth of an inch—as a result of disassembly of a wheel having an inflated tire mounted thereon.

17. The method according to claim 15:

further comprising securing the outer rim portion to the inner rim portion with a plurality of circumferentially spaced wheel assembly fasteners; and permitting the outer rim portion to separate from the inner rim portion a sufficient distance to vent air from the tire, and resisting farther travel of the outer rim portion through the interaction of the safety bosses and safety tabs upon the failure of some of the wheel assembly fasteners.

18. The method according to claim 17, further comprising providing wheel assembly fasteners that are visually distinguishable from the fasteners used to mount the tire/wheel assembly to the vehicle.

* * * * *